(12) United States Patent
Bach et al.

(10) Patent No.: US 11,072,316 B2
(45) Date of Patent: Jul. 27, 2021

(54) BRAKING DEVICE FOR A HYDRAULIC MOTOR VEHICLE BRAKING SYSTEM HAVING A BALL SCREW DRIVE

(71) Applicant: Continental Teves AG & Co. oHG, Frankfurt (DE)

(72) Inventors: Uwe Bach, Niedernhausen (DE); Jens Hoffmann, Darmstadt (DE); Martin Gädke, Hofheim/Ts. (DE); Holger von Hayn, Bad Vilbel (DE); Ahmed Sefo, Frankfurt (DE); Adrian Messner, Mainz (DE); Wolfgang Ritter, Oberursel/TS. (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 156 days.

(21) Appl. No.: 16/082,802

(22) PCT Filed: May 11, 2017

(86) PCT No.: PCT/EP2017/061330
§ 371 (c)(1),
(2) Date: Sep. 6, 2018

(87) PCT Pub. No.: WO2017/194674
PCT Pub. Date: Nov. 16, 2017

(65) Prior Publication Data
US 2019/0092298 A1 Mar. 28, 2019

(30) Foreign Application Priority Data
May 13, 2016 (DE) .................... 10 2016 208 348.1

(51) Int. Cl.
*B60T 11/18* (2006.01)
*B60T 7/04* (2006.01)
(Continued)

(52) U.S. Cl.
CPC ................. *B60T 11/18* (2013.01); *B60T 7/04* (2013.01); *B60T 7/042* (2013.01); *B60T 7/12* (2013.01);
(Continued)

(58) Field of Classification Search
CPC ... B60T 7/04; B60T 7/042; B60T 7/12; B60T 11/18; B60T 11/20; B60T 13/74;
(Continued)

(56) References Cited

U.S. PATENT DOCUMENTS

| 8,468,820 B2 | 6/2013 | Drumm |
| 8,874,343 B2 | 10/2014 | Anderson et al. |

(Continued)

FOREIGN PATENT DOCUMENTS

| CN | 104442783 A * | 3/2015 |
| DE | 102004050103 A1 | 4/2006 |

(Continued)

OTHER PUBLICATIONS

English machined translation of WO-2010088920, Aug. 12, 2010.*
(Continued)

*Primary Examiner* — Robert A. Siconolfi
*Assistant Examiner* — San M Aung
(74) *Attorney, Agent, or Firm* — RatnerPrestia

(57) ABSTRACT

A braking device for a hydraulic motor vehicle braking system having an electromechanically driven booster stage and a ball screw drive. In order to provide a braking device which is of particularly compact, cost-effective and weight-saving construction and has short pedal strokes, and an easily adjustable pedal characteristic curve, at the same time enabling effective direct action in case of failure of the booster stage and comfortable haptic feedback at the pedal during normal operation, the actuating force from a piston rod is introduced into the spindle, wherein the piston rod can (Continued)

be moved axially to a limited extent relative to the spindle and a spring element is inserted in the flow of force of the actuating force between the piston rod and the spindle, which spring is compressed axially when the actuating force is introduced.

11 Claims, 3 Drawing Sheets

(51) Int. Cl.
    *B60T 7/12* (2006.01)
    *B60T 11/20* (2006.01)
    *B60T 13/74* (2006.01)
    *F16D 121/24* (2012.01)

(52) U.S. Cl.
    CPC ............... *B60T 11/20* (2013.01); *B60T 13/74* (2013.01); *B60T 13/745* (2013.01); *F16D 2121/24* (2013.01)

(58) Field of Classification Search
    CPC .... B60T 13/745; B60T 13/662; B60T 13/686; B60T 7/06; B60T 13/12; B60T 13/68
    USPC ............................................. 303/3, 113.1, 20
    See application file for complete search history.

(56) References Cited

U.S. PATENT DOCUMENTS

| | | | |
|---|---|---|---|
| 8,899,696 | B2 | 12/2014 | Weiberle et al. |
| 8,997,482 | B2 | 4/2015 | Richard et al. |
| 9,227,611 | B2 | 1/2016 | Gilles |
| 9,663,088 | B2 | 5/2017 | Takayama et al. |
| 2010/0242469 | A1* | 9/2010 | Jungbecker ........... B60T 13/745 60/594 |
| 2011/0241418 | A1* | 10/2011 | Nozawa ................ B60T 13/586 303/3 |
| 2011/0253490 | A1* | 10/2011 | Vollert .................. B60T 13/745 188/156 |
| 2012/0013173 | A1* | 1/2012 | Leiber .................... B60T 8/4077 303/9.75 |
| 2013/0127237 | A1* | 5/2013 | Pfeiffer ................. B60T 8/4077 303/6.01 |
| 2013/0199364 | A1* | 8/2013 | Weiberle .................. B60T 1/10 92/139 |
| 2014/0095044 | A1 | 4/2014 | Kikawa et al. |
| 2014/0202145 | A1 | 7/2014 | Kuramochi et al. |
| 2014/0319902 | A1* | 10/2014 | Benzler ................. B60T 13/586 303/6.01 |
| 2015/0344013 | A1 | 12/2015 | Knechtges et al. |

FOREIGN PATENT DOCUMENTS

| | | |
|---|---|---|
| DE | 102008038320 A1 | 5/2009 |
| DE | 102008039306 A1 | 5/2009 |
| DE | 102011083113 A1 | 5/2012 |
| DE | 102014202568 A1 | 8/2015 |
| WO | 2010006996 A1 | 1/2010 |
| WO | 2010088920 A1 | 8/2010 |
| WO | 2011026804 A1 | 3/2011 |
| WO | 2011098178 A1 | 8/2011 |
| WO | 2012152352 A1 | 11/2012 |
| WO | 2014095286 A1 | 6/2014 |

OTHER PUBLICATIONS

German Search Report for German Application No. 10 2016 208 348.1, dated Dec. 12, 2016, with partial translation—9 pages.
International Search Report and Written Opinion for International Application No. PCT/EP2017/061330, dated Jul. 28, 2017—9 pages.

* cited by examiner

BRAKING DEVICE FOR A HYDRAULIC MOTOR VEHICLE BRAKING SYSTEM HAVING A BALL SCREW DRIVE

CROSS REFERENCE TO RELATED APPLICATIONS

This application is the U.S. National Phase Application of PCT International Application No. PCT/EP2017/061330, filed May 11, 2017, which claims priority to German Patent Application No. 10 2016 208 348.1, filed May 13, 2016, the contents of such applications being incorporated by reference herein.

FIELD OF THE INVENTION

The invention relates to a braking device for a hydraulic motor vehicle braking system.

BACKGROUND OF THE INVENTION

For hydraulic braking systems on motor vehicles, the use of braking devices which have a brake master cylinder with a cylinder piston that can be moved in a linear manner to produce brake pressure and have an electromechanical booster stage that acts on the cylinder piston is known. In this case, the booster stage is driven by a drive unit having a rotating drive shaft and, to convert the rotary motion of the drive shaft into a translational motion, uses a ball screw drive.

Units of this kind have the advantage that they can also be controlled in an autonomous fashion by an electronic control unit, independently of the driver. However, direct action by the driver must also be implemented—the possibility of actuating the brake directly with the actuating or foot force of the driver in the event of a malfunction or failure of the booster stage. This may be necessary, for example, if the electric power supply or the drive unit fails, but may also be necessary during rapid full braking operations in order to assist the boosting force. At the same time, a gentle and comfortable haptic feedback or reaction force at the brake pedal is demanded during normal operation.

DE 10 2008 038 320 A1, incorporated by reference herein, has disclosed a braking device of the type in question having a ball screw drive. Here, the boosting force is introduced into the cylinder piston by a hollow-bored spindle (hollow spindle) of the ball screw drive. The direct action is accomplished by means of a particularly long piston rod, which extends through the hollow spindle and which can be used by the driver to act on the cylinder piston independently of the spindle. An elastic reaction element, which provides the reaction force and thus the haptic feedback at the pedal, is arranged between the piston rod and the spindle, on the one hand, and the cylinder piston, on the other hand.

It is regarded as a disadvantage that, the construction of the booster stage is complex overall and that production is expensive. For adequate rigidity, the piston rod must be designed with a relatively large outside diameter, as a result of which the hollow spindle and all the other coaxially arranged components, and consequently the weight and external dimensions, are enlarged. Moreover, the production of a hollow spindle is very expensive.

SUMMARY OF THE INVENTION

An aspect of the invention is an improved braking device of the type stated at the outset which, while avoiding the abovementioned disadvantages, is of as compact, weight-saving and space-saving construction as possible, nevertheless allows effective direct action on the cylinder piston in the event of failure of the booster stage and, during normal operation, allows comfortable haptic feedback at the pedal.

An aspect of the invention envisages that the actuating force from a piston rod is introduced into the spindle, while, at the same time, the piston rod is arranged in such a way that it can be moved axially to a limited extent relative to the spindle, and a spring element is provided in the flow of force of the actuating force between the piston rod and the spindle, which spring is compressed axially when the actuating force is introduced.

The associated series, rather than parallel, connection of the boosting force and the actuating force eliminates the need for an expensive hollow spindle, and a more advantageous and lighter solid spindle with a smaller outside diameter can be used. The radial extent and weight of the overall booster stage are significantly reduced.

Moreover, the reaction force can be set in accordance with customer requirements in a manner which is very simple in terms of design, simply by adapting the properties of the spring element, e.g. a diaphragm spring pack, rubber washer etc., and can be matched to the familiar, comfortable spring characteristic curve of a pneumatic brake booster, for example. Furthermore, the basic characteristic curve of the braking device can additionally be modified at the software level by intelligent control of the drive unit, allowing the drive unit to be set individually according to driver requirements, thereby making it possible to achieve almost any desired haptic feedback at the brake pedal and simultaneously to keep the idle travel of the pedal short.

In a refinement, an aspect of the invention envisages that the ball screw drive has an outer pot with external toothing, to which rotation is imparted by the drive unit via the external toothing—by means of a belt drive or a gear mechanism, for example—and the ball screw drive is secured against rotation and guided in a manner which allows linear movement in the outer pot by virtue of the fact that the ball screw nut has a noncircular outer contour which cooperates with an inner contour of the outer pot, said inner contour corresponding thereto at least in some region or regions.

Direct action by the driver is thus possible at any time and independently of the drive mechanism.

In a refinement of an aspect of the invention, the spring element is arranged in a spring element housing, which is mounted in a manner which allows linear movement in the booster housing. With reference to a particularly preferred refinement, the spring element housing is coupled to the spindle by a joint which transmits force, at least in the axial direction, and the piston rod is mounted in a manner which allows axial movement relative to the spring element housing.

It is thus possible, on the one hand, for the securing of the spindle against rotation to be performed by the spring element housing and for the spindle to be further reduced in size and simplified and, on the other hand, for the pedal characteristic curve of the same braking device to be set individually simply by exchanging the spring element.

It is furthermore possible, with reference to an embodiment according to an aspect of the invention, for the spring element to have at least one diaphragm spring, preferably a diaphragm spring pack, thereby making possible a permanent solution which is inexpensive, simple to adapt and particularly wear resistant.

With reference to a further embodiment according to an aspect of the invention, the spring element can comprise an elastomeric material or can be manufactured entirely from said material, thereby making the haptic feedback particularly comfortable by virtue of the intrinsic internal damping of the spring element and enabling it to be very finely tuned by changing the composition of the elastomer.

An aspect of the invention furthermore envisages that a bearing housing made of metal is arranged in the booster housing in order to hold bearing elements for the rotatable mounting of the outer pot.

As a result, the bearing forces in the bearing housing are distributed over a larger area, and the booster housing can be of inexpensive and weight-saving design and can be made of plastic in an almost infinitely variable variety of shapes, according to requirements.

Furthermore, the bearing housing can be produced at particularly low cost from sheet metal, by a deep-drawing method for example, and in this way the weight and production costs of the braking device can be further reduced.

An aspect of the invention furthermore envisages that a sensor device having a fixed sensing part and a transmitter part that can be moved in a linear manner for detecting the position and/or the movement of the piston rod is provided, wherein the transmitter part is coupled to the piston rod.

In this way, it is possible, on the one hand, for particularly rapid detection of a braking demand of the driver to be achieved and, on the other hand, it is thereby possible, e.g. in conjunction with a pressure sensor on the brake master cylinder, to detect all the signals relevant for control directly at the braking device, there being no need for intervention into components that are not intrinsic to the braking device, e.g. a rotation angle sensor at the brake pedal, and the installation of the braking device in the vehicle is likewise simplified.

In a preferred refinement, an aspect of the invention envisages that a return spring for returning the spindle to the unbraked initial position thereof is clamped between the bearing housing and the spring element housing, wherein the return spring is axially preloaded both by the action of the actuating force and that of the boosting force.

It is thus possible to dispense with an additional return spring for the piston rod, the number of components is reduced and the booster stage is of compact configuration.

BRIEF DESCRIPTION OF THE DRAWINGS

Further features and advantages of an aspect of the invention will emerge from the following description of an exemplary embodiment and from the drawings, in which.

DETAILED DESCRIPTION OF THE PREFERRED EMBODIMENTS

Figure 1:
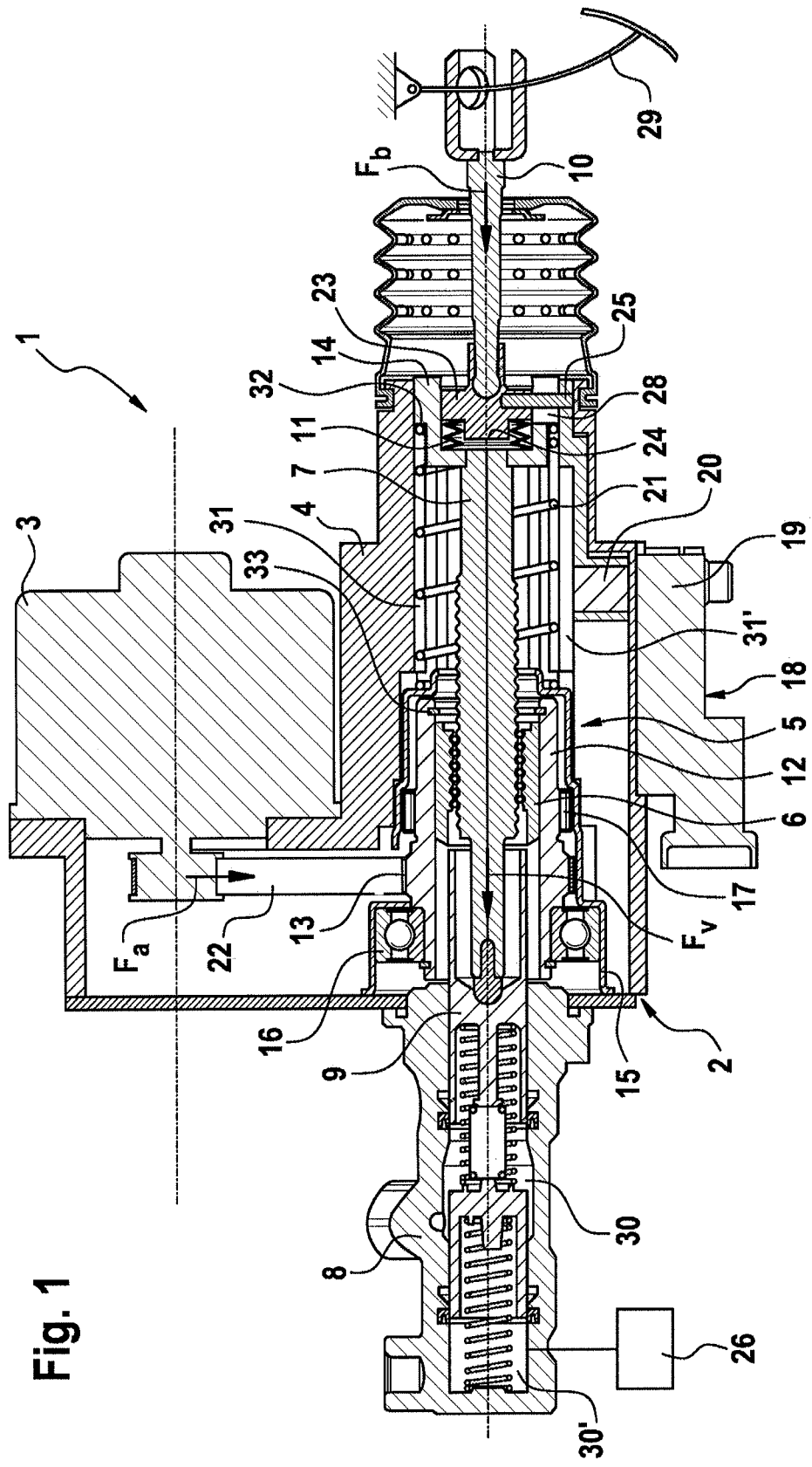
FIG. 1 shows an embodiment according to an aspect of the invention of the braking device in longitudinal section in an unactuated initial state.

FIG. 1:

The braking device 1 according to an aspect of the invention essentially comprises a booster stage 2, which is driven by an electric-motor drive unit 3 and on which a brake master cylinder 8 is mounted. In the example under consideration, it is a tandem brake master cylinder of plunger-type construction, although other types of brake master cylinder can also likewise be used within the scope of an aspect of the invention.

A cylinder piston 9 is mounted in the brake master cylinder 8 in such a way that it can be moved in a linear manner in the axial direction, said piston producing brake pressure through its movement in pressure chambers 30, 30', which are filled with pressure medium and are connected to wheel brakes. An optionally present pressure sensor 26 records the current brake pressure.

The booster stage 2 has a booster housing 4, which is preferably produced from plastic and in which a ball screw drive 5 is arranged.

By means of a toothed belt 22, the drive unit 3 drives an outer pot 12, on which external toothing 13 is formed for this purpose. The outer pot 12 is of internally hollow configuration and is rotatably mounted in the circumferential direction in a bearing housing 15 by means of bearing elements 16 and 17. The bearing housing 15 is produced from metal, preferably from a thin-walled metal sheet, and is fixed in the booster housing 4.

A ball screw nut 6 is guided in a manner which allows linear movement and arranged in a manner secured against rotation in the outer pot 12. To achieve the securing against rotation, the ball screw nut 6 has a noncircular outer contour, and the outer pot 12 has a complementary inner contour corresponding thereto. On its side opposite the brake master cylinder 8, the ball screw nut 6 is supported against an axially fixed stop 33 in the outer pot 12.

In accordance with the principle of construction of a ball screw drive, the ball screw nut 6 is in engagement with a spindle 7 via a plurality of balls. A spring element housing 14 is fastened in a manner secured against rotation on the opposite end of the spindle 7 from the brake master cylinder 8. The spring element housing 14 is of substantially pot-shaped configuration and preferably has a plurality of radial projections 32, which run in the axially extended grooves 31, 31' in the booster housing 4, thereby guiding the spindle 7 in the booster housing 4 in a manner secure against rotation.

A return spring 21 is arranged in such a way as to be clamped between the bearing housing 15 and the spring element housing 14. In the event of a braking operation, it is compressed by the movement of the spindle 7 in the direction of the brake master cylinder 8 and is used to return the spindle 7 to its unbraked initial position on completion of the braking operation.

A brake pedal 29 is provided for control of the braking device 1 by the driver, said pedal being coupled to a piston rod 10 capable of linear motion, into which the unboosted actuating force Fb is introduced. Secured on the opposite end of the piston rod 10 from the brake pedal 29 is a transmission piston 23, which is moved together with the piston 10.

The transmission piston 23 is guided in the spring element housing 14 and is arranged in such a way that it can be moved axially relative to the spindle 7 and at a distance therefrom. A spring element 11 is positioned between the transmission piston 23 and the spindle 7. In the embodiment shown, the spring element 11 is configured as a diaphragm spring pack. In the further embodiments according to an aspect of the invention, which are not shown, the spring element can also contain an elastomeric material or can be formed completely from said material, and can be disk-, ring- or cylinder-shaped, for example. A spiral spring is likewise permissible as the spring element 11 within the scope of an aspect of the invention, as is a combination of the abovementioned elements. The spring force of the spring element is preferably designed in such a way that it is lower than the force acting in the direction of the piston rod 10, which results from the in-series arrangement of the spring force of the return spring 21 and the resistance force of the cylinder piston 9.

When the brake pedal 29 is actuated, the piston rod 10 is thus first of all moved toward the spindle 7 together with the transmission piston 23, and the spring element 11 is compressed during this process. The resulting resistance at the brake pedal 29, which rises as a function of the travel, is experienced by the driver as haptic feedback or a reaction force of the braking device 1. This feedback can be influenced and matched to the respective application-specific requirements in a very simple manner, merely by changing the spring element 11—e.g. the dimensions or stiffness thereof.

The chosen axial spacing between the transmission piston 23 and the spindle 7 is relatively small, in the range of a few millimeters, and can likewise be defined in a simple manner as required by structural means, by changing the axial extent of the transmission piston 23 or of the piston rod 10.

The aim here is that, in the event of a malfunction of the booster stage 2 or of a rapid full braking operation, the stop surface 24 of the transmission piston 23 comes into contact with the spindle 7 after as short an idle travel of the brake pedal 29 as possible and the actuating force Fb can be introduced directly into the spindle 7, without losses.

This means that, depending on the operating state, the boosting force Fv is added to the actuating force Fb in the spindle 7 and jointly introduced from the spindle 7 into the cylinder piston 9, or the spindle 7 is moved axially in the outer pot 12 together with the ball screw nut 6 by the actuating force Fb, irrespective of the operating state of the drive unit 3, and the actuating force Fb is introduced from the spindle 7 into the cylinder piston 9.

The actuation of the brake pedal 29 and the associated movement of the piston rod 10 is recorded by a sensor device 18. For this purpose, the sensor device 18 has a sensing part 19, which is arranged in a fixed location on the booster housing 4, and a movable transmitter part 20. In the embodiment shown, the transmitter part 20 is connected to the transmission piston 23 by a connecting element 25 embodied by way of example as a transverse bolt. In order to allow the movement of the connecting element, an aperture 28 is provided in the spring element housing 14. However, it is likewise conceivable, within the scope of an aspect of the invention, to connect the transmitter part 20 directly to the piston rod 10 or to the brake pedal 29. In another embodiment (not shown), it is likewise permissible to mount a sensor device—e.g. a rotary encoder—on the pedal bracket.

The signals recorded by the sensor device 18 are passed for further processing to an electronic control unit (not shown) and are employed for control of the drive unit 3 and also for further use, e.g. for switching a brake light.

It is likewise also possible for the braking device 1 to be controlled autonomously, independently of the driver, by an electronic control unit (not shown) which automatically activates the drive unit 3.

In the case of normal, boosted braking operation, a linear motion in the axial direction is imparted to the spindle 7 by the circumferential or rotary motion of the outer pot 12 together with the ball screw nut 6. The driving force Fa is introduced into the ball screw drive 5 by the toothed belt 22, and the boosting force Fv is transmitted from the spindle 7 directly into the cylinder piston 9.

In the event of a fault, e.g. failure of the electric power supply or of the drive unit 3, tearing of the toothed belt 22 and the like, the boosting force Fv is no longer available, and the cylinder piston 9 is thus moved exclusively by the unboosted actuating force Fb introduced into the spindle 7 in order to build up the brake pressure.

Figure 2A:
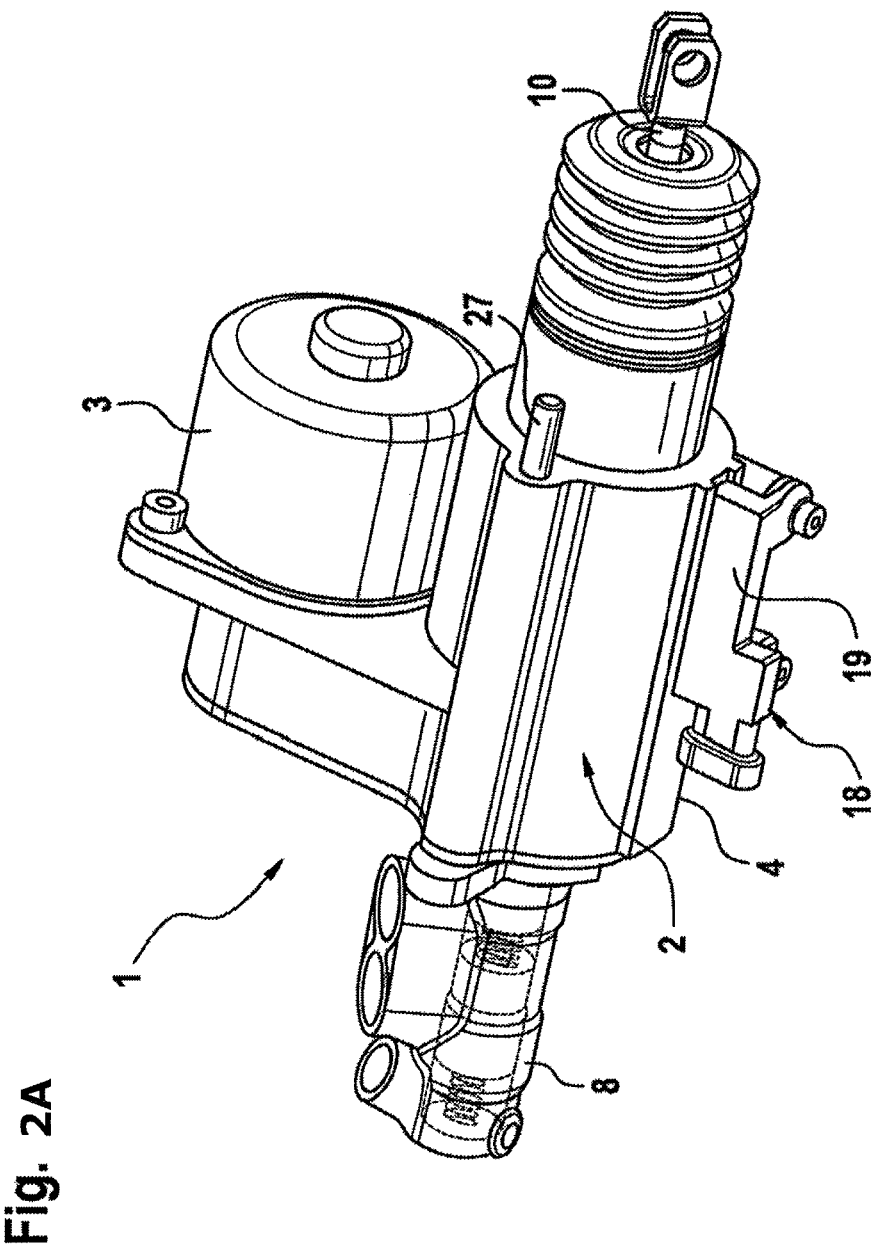
FIGS. 2A and 2B show the braking device shown in FIG. 1 in a three-dimensional external view (A) and a partially sectioned view (B).
Figure 2B:
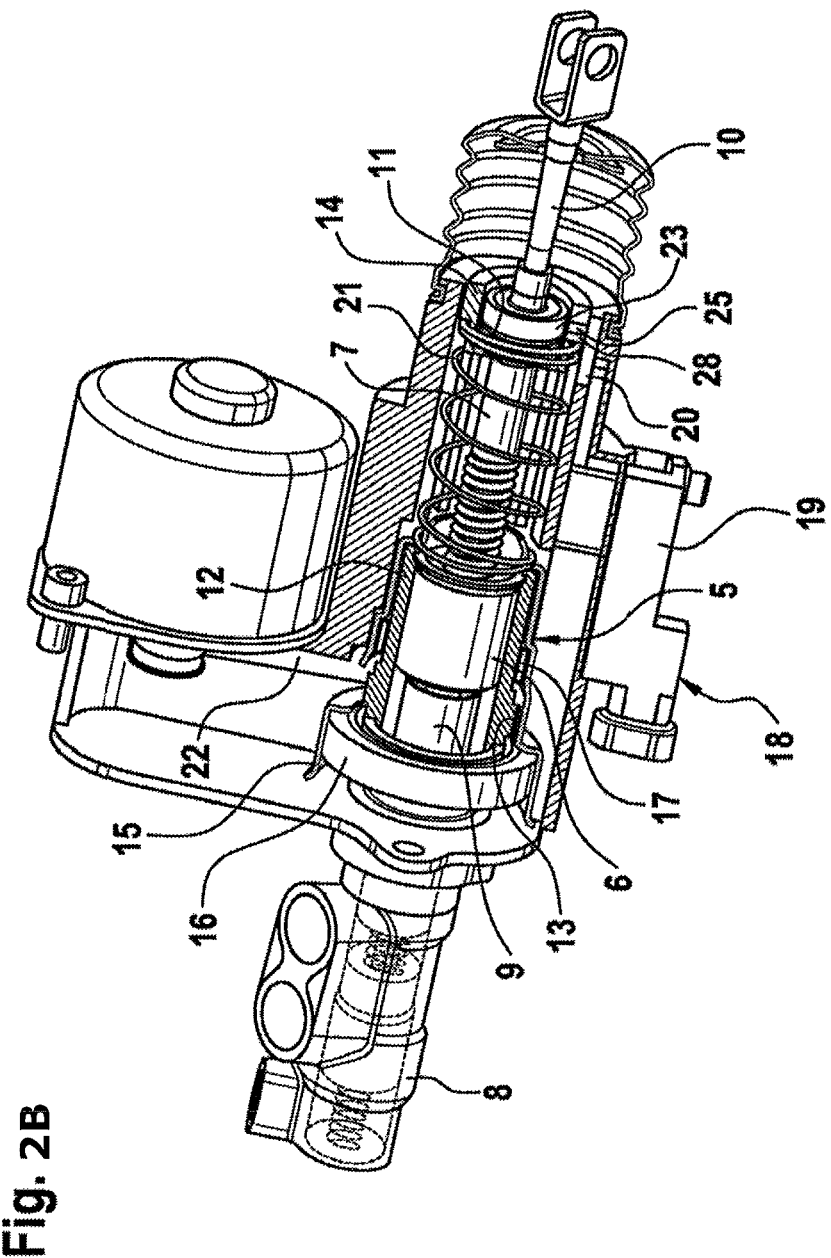

FIGS. 2A and 2B:

In FIGS. 2A and 2B, the braking device is illustrated in a three-dimensional external view. For simple and effective mounting of the braking device 1 on the vehicle (not shown here), mounting bolts 27 operating on the tie rod principle are used, said bolts passing through the booster housing 4 and simultaneously serving to fasten the brake master cylinder 8 of the booster stage 2. As a result, the braking device 1 according to an aspect of the invention can optionally be used instead of a conventional pneumatic brake booster, for example, using the same, already available mounting interfaces.

LIST OF REFERENCE SIGNS

1 Braking device
2 Booster stage
3 Drive unit
4 Booster housing
5 Ball screw drive
6 Ball screw nut
7 Spindle
8 Brake master cylinder
9 Cylinder piston
10 Piston rod
11 Spring element
12 Outer pot
13 External toothing
14 Spring element housing
15 Bearing housing
16 Bearing element
17 Bearing element
18 Sensor device
19 Sensing part
20 Transmitter part
21 Return spring
22 Drive belt
23 Transmission piston
24 Stop surface
25 Connecting element
26 Pressure sensor
27 Mounting bolt
28 Aperture
29 Brake pedal
30 Pressure chamber
31 Groove
32 Projection
33 Stop
Fa Driving force
Fb Actuating force
Fv Boosting force

The invention claimed is:

1. A braking device for a hydraulic motor vehicle braking system, comprising:
    an electromechanical booster stage, which is driven by an electric-motor drive unit and has a booster housing, in which a ball screw drive having a rotatable ball screw nut and a spindle that can be moved in a linear manner is arranged for converting a rotary driving force of the drive unit into a translational boosting force, a brake master cylinder having a cylinder piston which can be moved in a linear manner therein and acted upon both with an unboosted actuating force by the driver and with the boosting force by the booster stage, wherein the actuating force from a piston rod is introduced into the spindle, and wherein the piston rod can be moved axially to a limited extent relative to the spindle and a spring element is inserted in the flow of force of the actuating force between the piston rod and the spindle, which spring is compressed axially when the actuating force is introduced, the spring element being housed in a spring element housing formed separately from and coupled to the spindle, the spring element housing being directly joined to the spindle by a joint which transmits force, at least in the axial direction.

2. The braking device as claimed in claim 1, wherein the ball screw drive has an outer pot with external toothing, to which rotation is imparted by the drive unit via the external toothing, and the ball screw drive is secured against rotation and guided in a manner which allows linear movement in the outer pot by virtue of the fact that the ball screw nut has a noncircular outer contour which cooperates with an inner contour of the outer pot, said inner contour corresponding thereto at least in some region or regions.

3. The braking device as claimed in claim 1, wherein the spring element housing is mounted in a manner which allows linear movement in the booster housing.

4. The braking device as claimed in claim 3, wherein the piston rod is mounted in a manner which allows axial movement relative to the spring element housing.

5. The braking device as claimed in claim 1, wherein the booster housing is made of plastic.

6. The braking device as claimed in claim 1, wherein the spring element has at least one diaphragm spring.

7. The braking device as claimed in claim 1, wherein the spring element comprises elastomeric material.

8. The braking device as claimed in claim 1, wherein a bearing housing made of metal is arranged in the booster housing in order to hold bearing elements for the rotatable mounting of the outer pot.

9. The braking device as claimed in claim 1, wherein a sensor device having a fixed sensing part and a transmitter part that can be moved in a linear manner for detecting the position and/or the movement of the piston rod is provided, wherein the transmitter part is coupled to the piston rod.

10. The braking device as claimed in claim 8 wherein a return spring for returning the spindle to the unbraked initial position thereof is clamped between the bearing housing and the spring element housing, wherein the return spring is axially preloaded both by the action of the actuating force and that of the boosting force.

11. The braking device as claimed in claim 1, wherein a sensor device having a fixed sensing part and a transmitter part that can be moved in a linear manner for detecting the position and/or the movement of the piston rod is provided, wherein the transmitter part is coupled to the piston rod via a connecting element which extends through an aperture in the spring element housing.

* * * * *